United States Patent
Maltsev et al.

(10) Patent No.: US 7,933,353 B2
(45) Date of Patent: Apr. 26, 2011

(54) COMMUNICATION SYSTEM AND TECHNIQUE USING QR DECOMPOSITION WITH A TRIANGULAR SYSTOLIC ARRAY

(75) Inventors: Alexander Maltsev, Nizhny Novgorod (RU); Vladimir Pestretsov, Nizhny Novgorod (RU); Alexey Khoryaev, Dzerzhinsk (RU); Roman Maslennikov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 458 days.

(21) Appl. No.: 12/088,500

(22) PCT Filed: Sep. 30, 2005

(86) PCT No.: PCT/RU2005/000492
§ 371 (c)(1),
(2), (4) Date: Aug. 13, 2008

(87) PCT Pub. No.: WO2007/037716
PCT Pub. Date: Apr. 5, 2007

(65) Prior Publication Data
US 2009/0310656 A1    Dec. 17, 2009

(51) Int. Cl.
*H04B 7/02* (2006.01)
*H04L 1/02* (2006.01)

(52) U.S. Cl. ........ 375/267; 375/260; 375/299; 375/347; 375/349

(58) Field of Classification Search .................. 375/260, 375/267, 299, 347, 349
See application file for complete search history.

(56) References Cited

U.S. PATENT DOCUMENTS

| 4,727,503 A | * | 2/1988 | McWhirter .................. 708/200 |
| 5,018,065 A | | 5/1991 | McWhirter et al. |
| 5,294,933 A | | 3/1994 | Lee et al. |
| 5,845,123 A | | 12/1998 | Johnson et al. |
| 6,675,187 B1 | * | 1/2004 | Greenberger ................ 708/622 |

FOREIGN PATENT DOCUMENTS
WO    2007037716 A1    4/2007
* cited by examiner

*Primary Examiner* — Curtis B Odom
(74) *Attorney, Agent, or Firm* — Kacvinsky Daisak PLLC

(57) ABSTRACT

An apparatus, system, and method to perform QR decomposition of an input complex matrix are described. The apparatus may include a triangular systolic array to load the input complex matrix and an identity matrix, to perform a unitary complex matrix transformation requiring three rotation angles, and to produce a complex unitary matrix and an upper triangular matrix. The upper triangular matrix may include real diagonal elements. Other embodiments are described and claimed.

25 Claims, 8 Drawing Sheets

COMMUNICATION SYSTEM AND TECHNIQUE USING QR DECOMPOSITION WITH A TRIANGULAR SYSTOLIC ARRAY

BACKGROUND

Modern wireless communication systems may operate according to Institute of Electrical and Electronics Engineers (IEEE) standards such as the 802.11 standards for Wireless Local Area Networks (WLANs) and the 802.16 standards for Wireless Metropolitan Area Networks (WMANs). Worldwide Interoperability for Microwave Access (WiMAX) is a wireless broadband technology based on the IEEE 802.16 standard of which IEEE 802.16-2004 and the 802.16e amendment are Physical (PHY) layer specifications. IEEE 802.16-2004 supports several multiple-antenna techniques including Alamouti Space-Time Coding (STC), Multiple-Input Multiple-Output (MIMO) antenna systems, and Adaptive Antenna Systems (AAS).

Future wireless communication systems are expected to support multiple antenna techniques such as MIMO and spatial division multiple access (SDMA) modes of transmission, which allow spatial multiplexing of data streams from one or multiple users. The performance and complexity of such systems will strictly depend on the number of antennas used. There is a need, therefore, to develop highly efficient architectures for realization of different signal processing algorithms in MIMO-OFDM systems having a large number of antenna elements.

DETAILED DESCRIPTION

Figure 1:
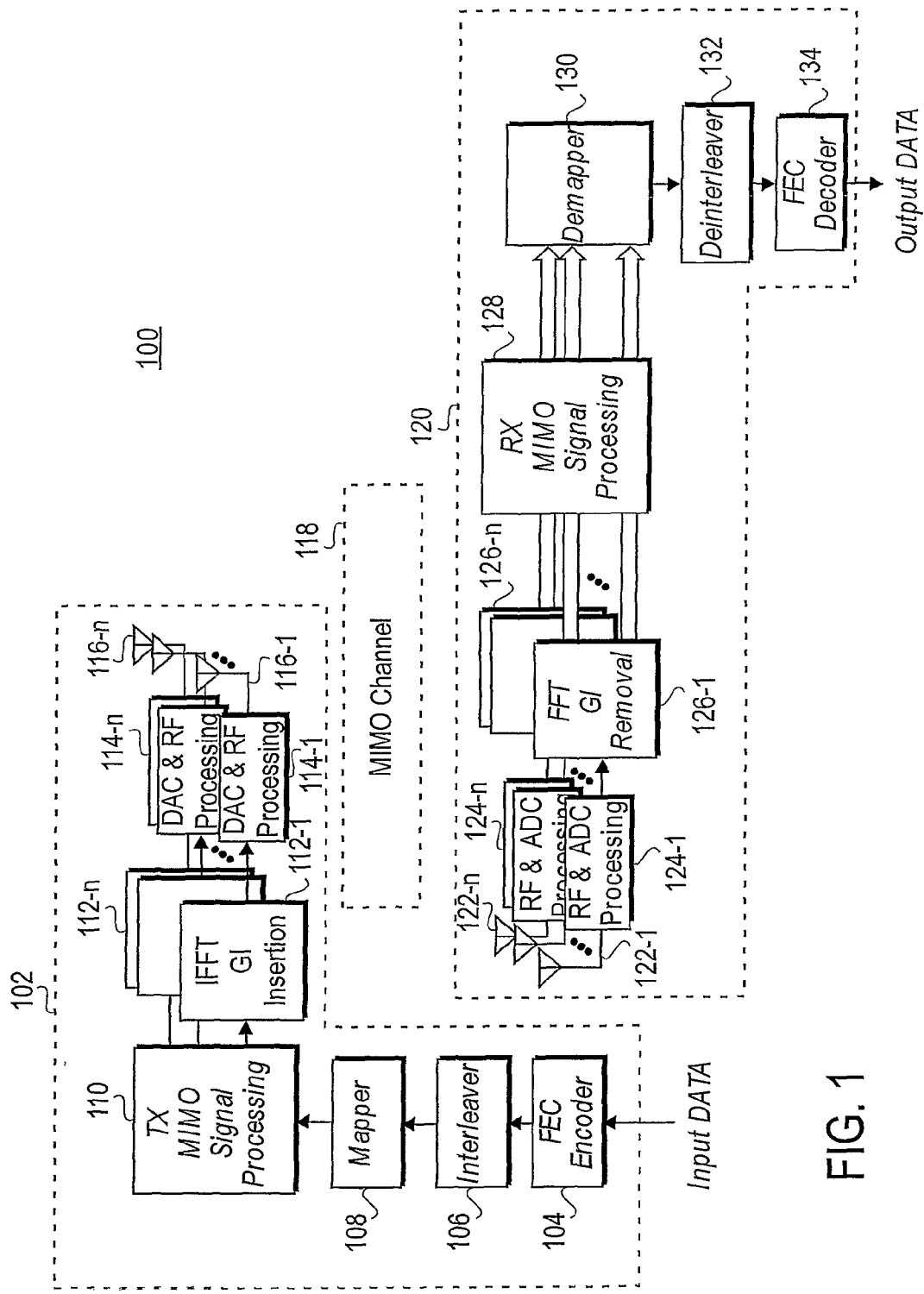
FIG. 1 illustrates one embodiment of a communications system.

FIG. 1 illustrates one embodiment of a system. FIG. 1 illustrates a block diagram of a communications system 100. In various embodiments, the communications system 100 may comprise multiple nodes. A node generally may comprise any physical or logical entity for communicating information in the communications system 100 and may be implemented as hardware, software, or any combination thereof, as desired for a given set of design parameters or performance constraints. Although FIG. 1 may show a limited number of nodes by way of example, it can be appreciated that more or less nodes may be employed for a given implementation.

In various embodiments, a node may comprise, or be implemented as, a computer system, a computer sub-system, a computer, an appliance, a workstation, a terminal, a server, a personal computer (PC), a laptop, an ultra-laptop, a handheld computer, a personal digital assistant (PDA), a set top box (STB), a telephone, a mobile telephone, a cellular telephone, a handset, a wireless access point, a base station (BS), a subscriber station (SS), a mobile subscriber center (MSC), a radio network controller (RNC), a microprocessor, an integrated circuit such as an application specific integrated circuit (ASIC), a programmable logic device (PLD), a processor such as general purpose processor, a digital signal processor (DSP) and/or a network processor, an interface, an input/output (I/O) device (e.g., keyboard, mouse, display, printer), a router, a hub, a gateway, a bridge, a switch, a circuit, a logic gate, a register, a semiconductor device, a chip, a transistor, or any other device, machine, tool, equipment, component, or combination thereof. The embodiments are not limited in this context.

In various embodiments, a node may comprise, or be implemented as, software, a software module, an application, a program, a subroutine, an instruction set, computing code, words, values, symbols or combination thereof. A node may be implemented according to a predefined computer language, manner or syntax, for instructing a processor to perform a certain function. Examples of a computer language may include C, C++, Java, BASIC, Perl, Matlab, Pascal, Visual BASIC, assembly language, machine code, microcode for a network processor, and so forth. The embodiments are not limited in this context.

The nodes of the communications system 100 may be arranged to communicate one or more types of information, such as media information and control information. Media information generally may refer to any data representing content meant for a user, such as image information, video information, graphical information, audio information, voice information, textual information, numerical information, alphanumeric symbols, character symbols, and so forth. Control information generally may refer to any data representing commands, instructions or control words meant for an automated system. For example, control information may be used to route media information through a system, or instruct a node to process the media information in a certain manner. The media and control information may be communicated from and to a number of different devices or networks.

In various implementations, the nodes of the communications system 100 may be arranged to segment a set of media information and control information into a series of packets. A packet generally may comprise a discrete data set having fixed or varying lengths, and may be represented in terms of bits or bytes. It can be appreciated that the described embodiments are applicable to any type of communication content or format, such as packets, cells, frames, fragments, units, and so forth.

The communications system 100 may communicate information in accordance with one or more standards, such as standards promulgated by the IEEE, the Internet Engineering Task Force (IETF), the International Telecommunications Union (ITU), and so forth. In various embodiments, for example, the communications system 100 may communicate information according to one or more IEEE 802 standards including IEEE 802.11 standards (e.g., 802.11a, b, g/h, j, n, and variants) for WLANs and/or 802.16 standards (e.g., 802.16-2004, 802.16.2-2004, 802.16e, 802.16f, and variants) for WMANs. The communications system 100 may communicate information according to one or more of the Digital Video Broadcasting Terrestrial (DVB-T) broadcasting standard and the High performance radio Local Area Network (HiperLAN) standard. The embodiments are not limited in this context.

In various embodiments, the communications system 100 may employ one or more protocols such as medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), and so forth.

The communications system 100 may include one or more nodes arranged to communicate information over one or more wired and/or wireless communications media. Examples of wired communications media may include a wire, cable, printed circuit board (PCB), backplane, switch fabric, semiconductor material, twisted-pair wire, co-axial cable, fiber optics, and so forth. An example of a wireless communication media may include portions of a wireless spectrum, such as the radio-frequency (RF) spectrum. In such implementations, the nodes of the system 100 may include components and interfaces suitable for communicating information signals over the designated wireless spectrum, such as one or more transmitters, receivers, transceivers, amplifiers, filters, control logic, antennas and so forth.

The communications media may be connected to a node using an input/output (I/O) adapter. The I/O adapter may be arranged to operate with any suitable technique for controlling information signals between nodes using a desired set of communications protocols, services or operating procedures. The I/O adapter may also include the appropriate physical connectors to connect the I/O adapter with a corresponding communications medium. Examples of an I/O adapter may include a network interface, a network interface card (NIC), a line card, a disc controller, video controller, audio controller, and so forth.

In various embodiments, the communications system 100 may comprise or form part of a network, such as a WiMAX network, a broadband wireless access (BWA) network, a WLAN, a WMAN, a wireless wide area network (WWAN), a wireless personal area network (WPAN), an SDMA network, a Code Division Multiple Access (CDMA) network, a Wideband CDMA (WCDMA) network, a Time Division Synchronous CDMA (TD-SCDMA) network, a Time Division Multiple Access (TDMA) network, an Extended-TDMA (E-TDMA) network, a Global System for Mobile Communications (GSM) network, an Orthogonal Frequency Division Multiplexing (OFDM) network, an Orthogonal Frequency Division Multiple Access (OFDMA) network, a North American Digital Cellular (NADC) network, a Universal Mobile Telephone System (UMTS) network, a third generation (3G) network, a fourth generation (4G) network, a local area network (LAN), a wide area network (WAN), a metropolitan area network (MAN), the Internet, the World Wide Web, a cellular network, a radio network, a satellite network, and/or any other communications network configured to carry data. The embodiments are not limited in this context.

The communications system 100 may employ various modulation techniques including, for example: OFDM modulation, Quadrature Amplitude Modulation (QAM), N-state QAM (N-QAM) such as 16-QAM (four bits per symbol), 32-QAM (five bits per symbol), 64-QAM (six bits per symbol), 128-QAM (seven bits per symbol), and 256-QAM (eight bits per symbol), Differential QAM (DQAM), Binary Phase Shift Keying (BPSK) modulation, Quadrature Phase Shift Keying (QPSK) modulation, Offset QPSK (OQPSK) modulation, Differential QPSK (DQPSK), Frequency Shift Keying (FSK) modulation, Minimum Shift Keying (MSK) modulation, Gaussian MSK (GMSK) modulation, and so forth. The embodiments are not limited in this context.

The communications system 100 may form part of a multi-carrier system such as a MIMO system. The MIMO system may employ one or more multi-carrier communications channels for communicating multi-carrier communication signals. A multi-carrier channel may comprise, for example, a wideband channel comprising multiple sub-channels. The MIMO system may be arranged to communicate one or more spatial data streams using multiple antennas. Examples of an antenna include an internal antenna, an omni-directional antenna, a monopole antenna, a dipole antenna, an end fed antenna, a circularly polarized antenna, a micro-strip antenna, a diversity antenna, a dual antenna, an antenna array, and so forth.

In various embodiments, the system 100 may comprise a physical (PHY) layer component for WLAN devices either hardware or software based on IEEE standards 802.11n, 802.16-2004, and/or 802.16e, for example. In one embodiment, the communications system 100 may comprise a transceiver for a MIMO-OFDM system. The embodiments are not limited in this context.

As shown in FIG. 1, the communications system 100 may be illustrated and described as comprising several separate functional elements, such as modules and/or blocks. In various embodiments, the modules and/or blocks may be connected by one or more communications media. Communications media generally may comprise any medium capable of carrying information signals. For example, communication media may comprise wired communication media, wireless communication media, or a combination of both, as desired for a given implementation.

The modules and/or blocks may comprise, or be implemented as, one or more systems, sub-systems, processors, devices, machines, tools, components, circuits, registers, applications, programs, subroutines, or any combination thereof, as desired for a given set of design or performance constraints. Although certain modules and/or blocks may be described by way of example, it can be appreciated that a greater or lesser number of modules and/or blocks may be used and still fall within the scope of the embodiments. Further, although various embodiments may be described in terms of modules and/or blocks to facilitate description, such modules and/or blocks may be implemented by one or more hardware components (e.g., processors, DSPs, PLDs, ASICs, circuits, registers), software components (e.g., programs, subroutines, logic) and/or combination thereof.

The communications system 100 may comprise a transmitter node 102. In one embodiment, for example, the transmitter node 102 may comprise a MIMO transmitter to transmit one or more spatial data streams over a multicarrier communication channel.

The transmitter node 102 may comprise an encoder block 104. In various embodiments, the encoder block 104 may be arranged to generate an encoded bit sequence from input data flow. The encoder block 104 may use various coding rates (e.g., ½, ⅔, ¾) depending on the puncturing pattern. In one embodiment, for example, the encoder block 104 may comprise an error-correcting encoder, such as a forward error correcting (FEC) encoder, and may generate a bit sequence encoded with an FEC code. In other embodiments, the encoder block 104 may comprise a convolutional encoder. The embodiments are not limited in this context.

The transmitter node 102 may comprise an interleaver block 106. In various embodiments, the interleaver block 106 may perform interleaving on the bits of the encoded bit sequence. In one embodiment, for example, the interleaver block 106 may comprise a frequency interleaver. The embodiments are not limited in this context.

The transmitter node 102 may comprise a mapper block 108. In various embodiments, the mapper block 108 may map the interleaved bit sequence into a sequence of transmit symbols. In one embodiment, for example, the mapper block 108 may map the interleaved bit sequence into a sequence of OFDM symbols. Each OFDM symbol may comprise N frequency symbols, with N representing a positive integer (e.g., 16, 64). In various implementations, the mapper block 108 may map the transmit symbols to subcarrier signals of a multicarrier communication channel.

The transmitter node 102 may comprise a transmit (TX) MIMO signal processing block 110. In various embodiments, the TX MIMO signal processing block 110 may be arranged to perform various multiple antenna signal processing techniques such as such as space-time coding (STC), TX beamforming, MIMO coding, and/or other MIMO processing techniques, for example. In various implementations, the TX MIMO signal processing block 110 may be arranged to apply beamformer and/or equalizer weights to transmit symbols (e.g., OFDM symbols). In various implementations, one or more of the MIMO signal processing techniques may involve the calculation of weight matrices for every subcarrier and/or or group of adjacent subcarriers and the multiplication of OFDM subcarrier symbols in the frequency domain by a weighting matrix. The embodiments are not limited in this context.

The transmitter node 102 may comprise inverse fast Fourier transform (IFFT) blocks 112-1-$n$, where n represents a positive integer value. In various embodiments, the IFFT blocks 112-1-$n$ may be arranged to convert OFDM symbols to time-domain signals. In various implementations, the IFFT blocks 112-1-$n$ may perform guard interval (GI) insertion. In such implementations, GI insertion may comprise inserting a time-domain guard interval between OFDM symbols to reduce inter-symbol interference.

The transmitter node 102 may comprise digital-to-analog conversion (DAC) and radio-frequency (RF) processing blocks 114-1-$n$, where n represents a positive integer value. In various embodiments, the DAC and RF processing blocks 114-1-$n$ may be arranged to perform DAC processing and to generate RF signals for transmission on the spatial channels of a multicarrier communication channel.

The transmitter node 102 may comprise transmit antennas 116-1-$n$, where n represents a positive integer value. In various embodiments, each of the transmit antennas 116-1-$n$ may correspond to one of the spatial channels of a multicarrier communications channel.

The transmitter node 102 may transmit information over communication channel 118. In various embodiments, the communication channel 118 may comprise a multicarrier communication channel (e.g., MIMO channel) for communicating multicarrier communication signals (e.g., OFDM signals). The MIMO channel may comprise, for example, a wideband channel comprising multiple subchannels. Each subchannel may comprise closely spaced orthogonal data subcarriers allowing a single OFDM symbol to be transmitted together by the data subcarriers. The embodiments are not limited in this context.

The communications system 100 may comprise a receiver node 120 for receiving information over communication channel 118. In various embodiments, the receiver node 120 may comprise receive antennas 122-1-$n$, where n represents a positive integer value. In various implementations, each of the receive antennas 122-1-$n$ may correspond to one of the spatial channels of a multicarrier communications channel.

The transmitter node 102 may comprise RF and analog-to-digital conversion (ADC) processing blocks 124-1-$n$, where n represents a positive integer value. In various embodiments, the RF and ADC processing blocks 124-1-$n$ may be arranged to perform RF and ADC processing on signals received on the spatial channels of a multicarrier communication channel.

The receiver node 122 may comprise fast Fourier transform (FFT) blocks 126-1-$n$, where n represents a positive integer value. In various embodiments, the FFT blocks 126-1-$n$ may be arranged to convert time-domain signals to frequency-domain signals. In various implementations, the FFT blocks 126-1-$n$ may perform GI removal. In such implementations, GI removal may comprise removing a time-domain guard interval between OFDM symbols.

The receiver node 122 may comprise a receive (RX) MIMO signal processing block 128. In various embodiments, the RX MIMO signal processing block 128 may be arranged to perform various multiple antenna signal processing techniques including, for example: channel estimation, frequency domain equalization, space-time decoding, RX beamforming, MIMO decoding, and/or other MIMO processing techniques such as MIMO detection schemes used in 802.11n and 802.16e transceivers. In various implementations, the RX MIMO signal processing block 128 may be arranged to calculate beamformer and/or equalization weights and to apply the beamformer and/or equalizer weights to receive symbols (e.g., OFDM symbols). In various implementations, one or more of the MIMO signal processing techniques may involve the calculation of weight matrices for every subcarrier and/or or group of adjacent subcarriers and the multiplication of OFDM subcarrier symbols in the frequency domain by a weighting matrix to produce linear estimates of the transmitted signal. The embodiments are not limited in this context.

The receiver node 120 may comprise a demapper block 130. In various embodiments, the demapper block 130 may be arranged to demap a sequence of symbols, such as a sequence of OFDM symbols. The embodiments are not limited in this context.

The receiver node 120 may comprise a deinterleaver block 132. In various embodiments, the deinterleaver block 132 may perform deinterleaving on the bits of the encoded bit sequence. In one embodiment, for example, the deinterleaver block 132 may comprise a frequency deinterleaver. The embodiments are not limited in this context.

The receiver node 120 may comprise a decoder block 134. In various embodiments, the decoder block 134 may be arranged to decode an encoded bit sequence into an output data flow. The decoder block 134 may use various coding rates (e.g., ½, ⅔, ¾) depending on the puncturing pattern. In one embodiment, for example, the decoder block 134 may comprise an error-correcting encoder, such as an FEC decoder, and may generate an output data flow from a bit sequence encoded with an FEC code. In other embodiments, the decoder 134 may comprise a convolutional decoder. The embodiments are not limited in this context.

In various embodiments, the communications system 100 may be arranged to implement a Triangular Systolic Array (TSA) Three Angle Complex Rotation (TACR) architecture and technique. The TSA/TACR architecture and technique may be used, for example, to implement various MIMO signal processing techniques requiring complex matrix calculations (e.g., computation, manipulation, inversion, multiplication, division, addition, subtraction, etc.). In various implementations, the TSA/TACR architecture and technique may be used to perform QR Decomposition (QRD) of complex matrices. In some embodiments, the TSA/TACR architecture and technique may employ processing elements based on the Coordinate Rotation Digital Computer (CORDIC) algorithm. In comparison with conventional QRD architectures and techniques, the TSA/TACR architecture and technique may provide significant latency reduction. The embodiments are not limited in this context.

Figure 2:
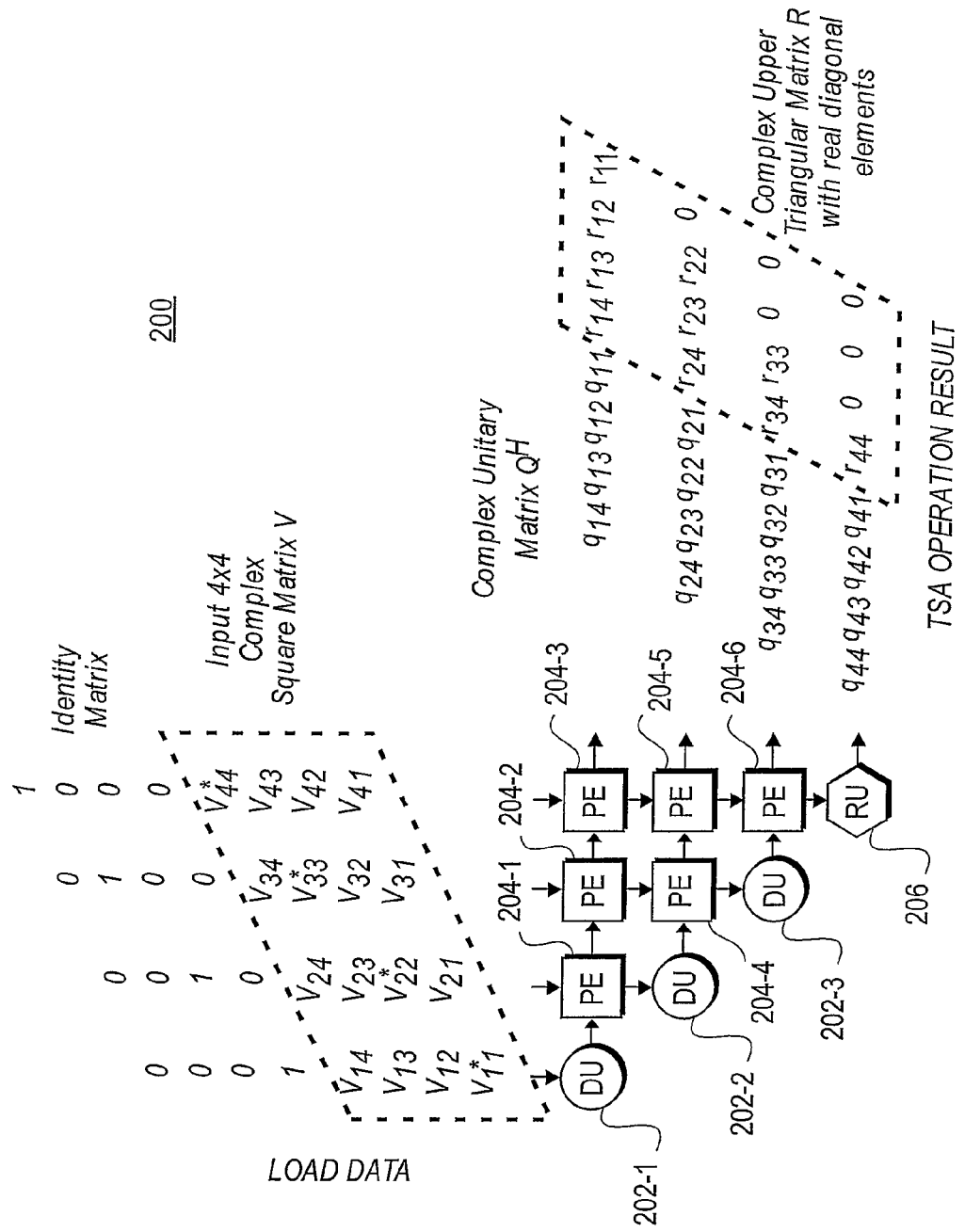
FIG. 2 illustrates one embodiment of a signal processing system.

FIG. 2 illustrates a signal processing system. FIG. 2 illustrates one embodiment of a signal processing system 200. In various embodiments, the signal processing system 200 may comprise, or be implemented as, a MIMO signal processing system such as the TX MIMO signal processing block 110 and/or RX MIMO signal processing block 128, for example. The embodiments are not limited in this context.

In various embodiments, the signal processing system 200 may be arranged to perform various MIMO signal processing techniques, such as MIMO detection schemes used in 802.11n and 802.16e transceivers, for example. The MIMO signal processing techniques may employ algorithms, such as Zero-Forcing (ZF) or Minimum Mean Square Error (MMSE) linear algorithms, due to the efficiency and relatively low computational complexity of such algorithms. In various implementations, the realization of the linear ZF and MMSE algorithms includes the calculation of weight matrices for every subcarrier (or group of adjacent subcarriers) and the multiplication of OFDM subcarrier symbols (in the frequency domain) from different antennas by a weighting matrix to obtain estimates of transmitted data symbols.

The weight matrices for ZF and MMSE algorithms, respectively, can be calculated as follows:

$$W(i)=(H(i)^H H(i))^{-1} H(i)^H \text{-ZF} \quad (1)$$

$$W(i)=(H(i)^H H(i)+\rho(i)I)^{-1} H(i)^H \text{-MMSE} \quad (2)$$

where:

i is a subcarrier index,

W(i) is a weight matrix for the i-th subcarrier,

H(i) is a channel transfer matrix for the i-th subcarrier,

I is the identity matrix, and

ρ(i) is a reciprocal to signal-to-noise ration (SNR) for the i-th subcarrier.

From the above equations (1) and (2), it can be seen that computational complexity for the ZF and MMSE algorithms arises from matrix inversion, which should be done for every subcarrier (or group of several adjacent subcarriers).

In various embodiments, the signal processing system 200 may be arranged to perform a QRD technique to solve the matrix inversion problem. The QRD technique may be implemented, for example, in MIMO and SDMA systems having a large number of transmit and receive antenna elements.

The QRD technique for matrix V finds matrices Q and R such that V=QR, where Q is a unitary matrix and R is a triangular matrix. If QR decomposition is performed, then the inverse matrix can be found as follows:

$$V^{-1}=(QR)^{-1}=R^{-1}Q^{-1}=R^{-1}Q^H \quad (3)$$

The inverse matrix for unitary matrix Q can be found as a Hermitian transposed matrix and the inversion of the triangular matrix R is straightforward using a back substitution algorithm.

In various embodiments, such as in 802.11n and 802.16e systems, the channel is measured using training symbols and/or pilots, which are followed by data symbols with spatial multiplexing. As such, the calculation of weight matrices should be done with a low latency so that the overall receive latency is not significantly impacted.

In various embodiments, the signal processing system 200 may employ dedicated hardware for matrix inversion to meet the stringent requirements of 802.11n and 802.16e systems. The dedicated hardware for implementing ZF or MMSE algorithms and QRD realization may comprise, for example, a weight calculation unit and a combiner unit to combine data subcarriers from different antennas using the weights. In various implementations, the signal processing system 200 may comprise, or be implemented as, a key processing unit for MIMO equalizer/beamformer weight calculation that may perform QRD of complex matrices. The embodiments are not limited in this context.

In various embodiments, the signal processing system 200 may comprise a TSA to perform QRD realization for matrix inversion. In various implementations, the TSA may comprise processing elements based on the CORDIC algorithm. Implementing the TSA using CORDIC-based processing elements may allow total QRD to be performed without multiplications. The CORDIC algorithm is designed for rotation of a two-dimensional vector in circular coordinate system, using only add and shift operations. The CORDIC algorithm is also designed for computation of different trigonometric functions (e.g., sin, cos, arctan, square roots, etc.). In general, computations of the CORDIC algorithm are based on the execution of add and shift operations and realized by consecutive iterations. An exemplary iteration of the CORDIC algorithm can be defined by the following equations:

$$x_{i+1}=x_i-\mu_i y_i 2^{-i}$$

$$y_{i+1}=y_i+\mu_i x_i 2^{-i}$$

$$z_{i+1}=z_i-\mu_i \theta_i \quad (4)$$

The CORDIC iteration above describes a rotation of an intermediate plane vector $v_i=(x_i, y_i)^T$ to $v_{i+1}=(x_{i+1}, y_{i+1})^T$. The third iteration variable $z_i$ keeps track of the rotation angle $\theta_i=\arctan(2^{-i})$.

The CORDIC algorithm may operate in different modes including rotation and vectoring modes of operation. The vectoring mode can be used to determine the magnitude and phase of a complex number, and the rotation mode can be applied to rotate a given complex number on a desired angle. The CORDIC modes differ in the way the direction of rotation $\mu_i$ is determined. For example, in rotation mode, the rotation direction (that is steered by the variable $\mu_i$, can be determined by the following rule:

$$\mu_i = \text{sign}(z_i) = \begin{cases} -1, & \text{if } z_i < 0 \\ +1, & \text{otherwise} \end{cases} \quad (5)$$

In vectoring mode, the rotation direction is chosen to drive the y coordinate to zero while keeping x coordinate positive. Such approach results in an output angle equal to arctangent of inputs quotient, namely, arctan(y/x). To achieve this, $\mu_i$ is chosen to be:

$$\mu_i = -\text{sign}(x_i) \cdot \text{sign}(y_i), \quad (6)$$

$$\text{where function sign}(A) = \begin{cases} -1, & \text{if } A < 0 \\ +1, & \text{otherwise} \end{cases}$$

In various embodiments, the signal processing system 200 may be arranged to implement a TSA/TACR architecture and technique for QRD of complex matrices. In various implementations, the TSA/TACR architecture and technique may employ both modes of CORDIC operations to perform QRD realization. In comparison with conventional QRD architectures and techniques, the TSA/TACR technique for QRD of complex matrices may provide a significant reduction of latency in terms of systolic operation time, for example.

One example of a conventional QRD technique is the Complex Givens Rotations (CGR) technique. In general, the CGR technique is used to selectively introduce a zero into a matrix. For QRD realization, the CGR technique can reduce an input matrix to triangular form by applying successive rotations to matrix elements below the main diagonal.

The CRG approach can be illustrated using a 2×2 square complex matrix $V_{2\times2}$ defined by the expression:

$$V_{2\times2} = \begin{bmatrix} Ae^{j\theta_a} & Ce^{j\theta_c} \\ Be^{j\theta_b} & De^{j\theta_d} \end{bmatrix} \quad (7)$$

where $j=\sqrt{-1}$; A, B, C, D—are magnitudes and $\theta_a$, $\theta_b$, $\theta_c$, $\theta_d$—are angles.

The CGR is described by two rotation angles $\theta_1$, $\theta_2$ through the following matrix transformation:

$$\begin{bmatrix} \cos\theta_1 & \sin\theta_1 e^{j\theta_2} \\ -\sin\theta_1 e^{-j\theta_2} & \cos\theta_1 \end{bmatrix} \cdot \begin{bmatrix} Ae^{j\theta_a} & Ce^{j\theta_c} \\ Be^{j\theta_b} & De^{j\theta_d} \end{bmatrix} = \begin{bmatrix} Xe^{j\theta_x} & Ye^{j\theta_y} \\ 0 & Ze^{j\theta_z} \end{bmatrix} \quad (8)$$

where angles $\theta_1$, $\theta_2$ are chosen to zero the matrix element below the main diagonal and defined by equations:

$\theta_1 = \tan^{-1}(B/A)$, $\theta_2 = \theta_a - \theta_b$ \quad (9)

It is easy to verify from equations (8) and (9) that the CGR technique leads to an upper triangular matrix having complex diagonal elements.

In contrast, the TSA/TACR technique for QRD may produce an upper triangular matrix having only real diagonal elements. In various embodiments, the TSA/TACR technique may comprise a unitary matrix transformation described by three rotation angles. In one embodiment, for example, the transformation for the QRD of the square complex matrix $V_{2\times2}$ of equation (7) may be presented by following equation:

$$\begin{bmatrix} \cos\theta_1 e^{j\theta_2} & \sin\theta_1 e^{j\theta_3} \\ -\sin\theta_1 e^{j\theta_2} & \cos\theta_1 e^{j\theta_3} \end{bmatrix} \quad (10)$$

In this embodiment, to obtain the upper triangular matrix, the unitary transformation requires three angles $\theta_1$, $\theta_2$, $\theta_3$ determined by the following equations:

$\theta_1 = \tan^{-1}(B/A)$;

$\theta_2 = -\theta_a$;

$\theta_3 = -\theta_b$ \quad (11)

The TSA/TACR technique results in the following upper triangular matrix.

$$\begin{bmatrix} \cos\theta_1 e^{j\theta_2} & \sin\theta_1 e^{j\theta_3} \\ -\sin\theta_1 e^{j\theta_2} & \cos\theta_1 e^{j\theta_3} \end{bmatrix} \cdot \begin{bmatrix} Ae^{j\theta_a} & Ce^{j\theta_c} \\ Be^{j\theta_b} & De^{j\theta_d} \end{bmatrix} = \begin{bmatrix} X & Ye^{j\theta_y} \\ 0 & Ze^{j\theta_z} \end{bmatrix} \quad (12)$$

It is noted that the matrix transformation of the TSA/TACR technique introduces the real element X on the matrix diagonal. As such, application of the TSA/TACR technique to a square matrix with an arbitrary N×N size will lead to the appearance of all real elements on the matrix diagonal except the lowest one. For further inversion of the upper triangular matrix, it is advantageous to eliminate the complex lowest diagonal element in order to avoid complex division. To produce an upper triangular matrix having only real diagonal elements, the TSA/TACR technique may comprise an additional unitary transformation. In one embodiment, for example, the additional matrix transformation for a square 2×2 matrix may comprise:

$$\begin{bmatrix} 1 & 0 \\ 0 & e^{-j\theta_z} \end{bmatrix} \cdot \begin{bmatrix} X & Ye^{j\theta_y} \\ 0 & Ze^{j\theta_z} \end{bmatrix} = \begin{bmatrix} X & Ye^{j\theta_y} \\ 0 & Z \end{bmatrix} \quad (13)$$

It is noted that the additional unitary transformation at the last phase of QRD does not complicate the hardware realization and may be embedded into a CORDIC-based TSA/TACR architecture.

In various embodiments, the signal processing system 200 may comprise a TSA/TACR architecture for complex matrices. As shown in FIG. 2, for example, the signal processing system 200 may comprise a TSA/TACR architecture including various processing modules having different functionality. In one embodiment, the TSA/TACR architecture may comprise Delay Unit (DU) modules 202-1-3, Processing Element (PE) modules 204-1-6, and Rotational Unit (RU) module 206. In various implementations, the DU modules 202-1-3, the PE modules 204-1-6, and the RU module 206 may comprise CORDIC-based processing blocks to perform the TSA/TACR technique for QRD. The embodiments are not limited in this context.

FIG. 2 illustrates one embodiment of input/output signal organization of the TSA/TACR architecture for performing QRD of an exemplary 4×4 input matrix V. According to the TSA/TACR technique, the input matrix V is loaded in the temporally (skewed) triangular shape and followed by an identity matrix to produce the complex unitary matrix $Q^H$ at the output. It is noted that the diagonal elements of the input matrix V are marked by token '*', which represents the control signal propagated together with a data element and controls the mode and/or functionality of the PE modules 204-1-6 and RU module 206.

In operation, the TSA/TACR architecture and technique for QRD results in an upper triangular matrix R having only real diagonal elements instead of complex elements, which result when using the CGR approach. As such, the TSA/TACR architecture and technique may significantly simplify the following inversion of matrix R when using a back substitution algorithm, which requires many divisions on diagonal elements of matrix R.

Figure 3C:
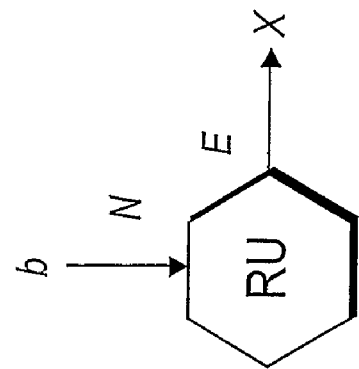
FIGS. 3A-3C illustrate one embodiment of signal processing modules.
Figure 3B:
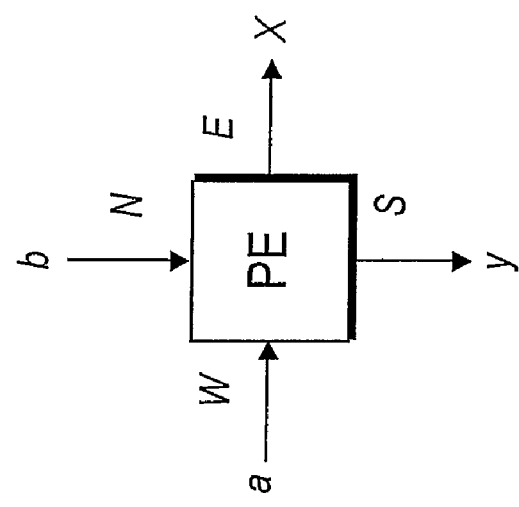
Figure 3A:
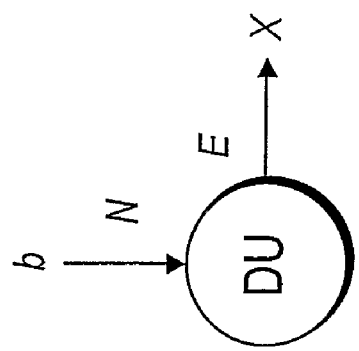

FIGS. 3A-3C illustrate one embodiment of processing modules. FIG. 3A illustrates one embodiment of a DU module 302. In various embodiments, the DU module 302 may comprise, or be implemented as, the DU modules 202-1-3 of the processing system 200. The embodiments are not limited in this context.

In various implementations, the DU module 302 may be arranged to read complex samples and/or control signals from a north input port N, to delay (e.g., for a period equal to PE operation time), and then to pass the complex samples and/or control signals to the east output port E.

FIG. 3B illustrates one embodiment of a PE module 304. In various embodiments, the PE module 304 may be implemented as, the PE modules 204-1-6 of the processing system 200. The embodiments are not limited in this context.

In various implementations, the PE module 304 may be arranged as a main signal processing element of a TSA. The structure of the PE module 304 may be based on a CORDIC processor comprising one or more hardwired CORDIC blocks. The number of CORDIC blocks and the associated architecture may be chosen in accordance with TSA design constraints that is tradeoff between TSA area and computation latency.

In various embodiments, the PE module 304 may operate in vectoring and rotation modes. The mode of the PE module 304 may be controlled by a flag *. In one embodiment, for example, the PE module 304 operates in vectoring mode if a data sample carries a flag * and enters the PE module 304 from a west input port W. In all other cases, the PE module 304 operates in rotation mode.

The PE module 304 may comprise CORDIC blocks configured to calculate angle and amplitude of input complex samples in vectoring mode. In various embodiments, in vectoring mode, the PE module 304 may receive complex samples a and b from a west input port W and a north input port N, respectively. The PE module 304 may be arranged to compute three angles $\theta_a = \arg(a)$, $\theta_b = \arg(b)$, $\theta_1 = \arctg(|b|/|a|)$ and to store the results into three internal angle registers.

In various embodiments, the PE module 304 may produce vectoring mode outputs comprising magnitude $\sqrt{|a|^2 + |b|^2}$ at the east output port E and zero sample at the south output port S. It is noted that the vectoring mode may require the use of three CORDIC operations (see FIG. 4B). In vectoring mode, an input control signal * present in the west input port W is to be asserted to the east output port E (from West to East).

The PE module 304 may comprise CORDIC blocks configured to perform vector rotation in polar coordinates in rotation mode. In various embodiments, in rotation mode, the samples a and b (taken from the west input port W and the north input port N, respectively) may be transformed to complex samples x and y according to the equation:

$$\begin{bmatrix} x \\ y \end{bmatrix} = \begin{bmatrix} \cos(\theta_1) & \sin(\theta_1) \\ -\sin(\theta_1) & \cos(\theta_1) \end{bmatrix} \cdot \begin{bmatrix} \exp(-i\theta_a) & 0 \\ 0 & \exp(-i\theta_b) \end{bmatrix} \cdot \begin{bmatrix} a \\ b \end{bmatrix}, \quad (14)$$

where $\theta_a$, $\theta_b$, $\theta_1$ are angles that were computed and stored during the vectoring mode of operation.

In various embodiments, the PE module 304 may produce rotation mode outputs comprising the transformed complex samples x and y at the east output port E and the south output port S, respectively. It is noted that four CORDIC operations may be required to perform the transformation described by equation (14). If the control signal * is present at the north input port N of the PE module 304, then it passes to the south output port S (from North to South).

FIG. 3C illustrates one embodiment of an RU module 306. In various embodiments, the RU module 306 may comprise, or be implemented as, the RU module 206 of the processing system 200. The embodiments are not limited in this context.

In various implementations, the RU 306 module may be arranged to eliminate complex lowest diagonal element of the output upper triangular matrix R by additional rotation. The RU module 306 may comprise one or more CORDIC blocks and may operate in vectoring or rotation modes. In one embodiment, for example, the RU module 306 may operate in vectoring mode if a control signal * appears at the north input port N.

In vectoring mode, the RU module 306 may receive a complex sample b from the north input port N and apply the CORDIC algorithm to compute angle $\theta_b = \arg(b)$ and magnitude $|b|$. The RU module 306 may store the angle $\theta_b = \arg(b)$ to an internal angle register $\theta_{reg} = \arg(b)$ and send the magnitude $|b|$ to the east output port E.

In rotation mode, the RU module 306 may rotate the complex sample b received at the north input port N by the angle $\theta_{reg}$ stored in the internal angle register. As a result, the RU module 306 may output a complex sample $x = \exp(-i\theta_{reg}) \cdot b$ at the output port E.

In various embodiments, the TSA/TACR architecture and technique for QRD may achieve latency reduction in comparison to conventional QRD architectures and techniques. To illustrate the advantages of the TSA/TACR architecture and technique, the latencies of PE modules based on the TSA/TACR and CGR approaches were compared. It is evident that TSA operation time required for the QRD is directly determined by the latency of PE modules and PE time complexity. It is noted that for both approaches, the PE modules may be realized using one or more hardwired CORDIC blocks.

Figure 4A:
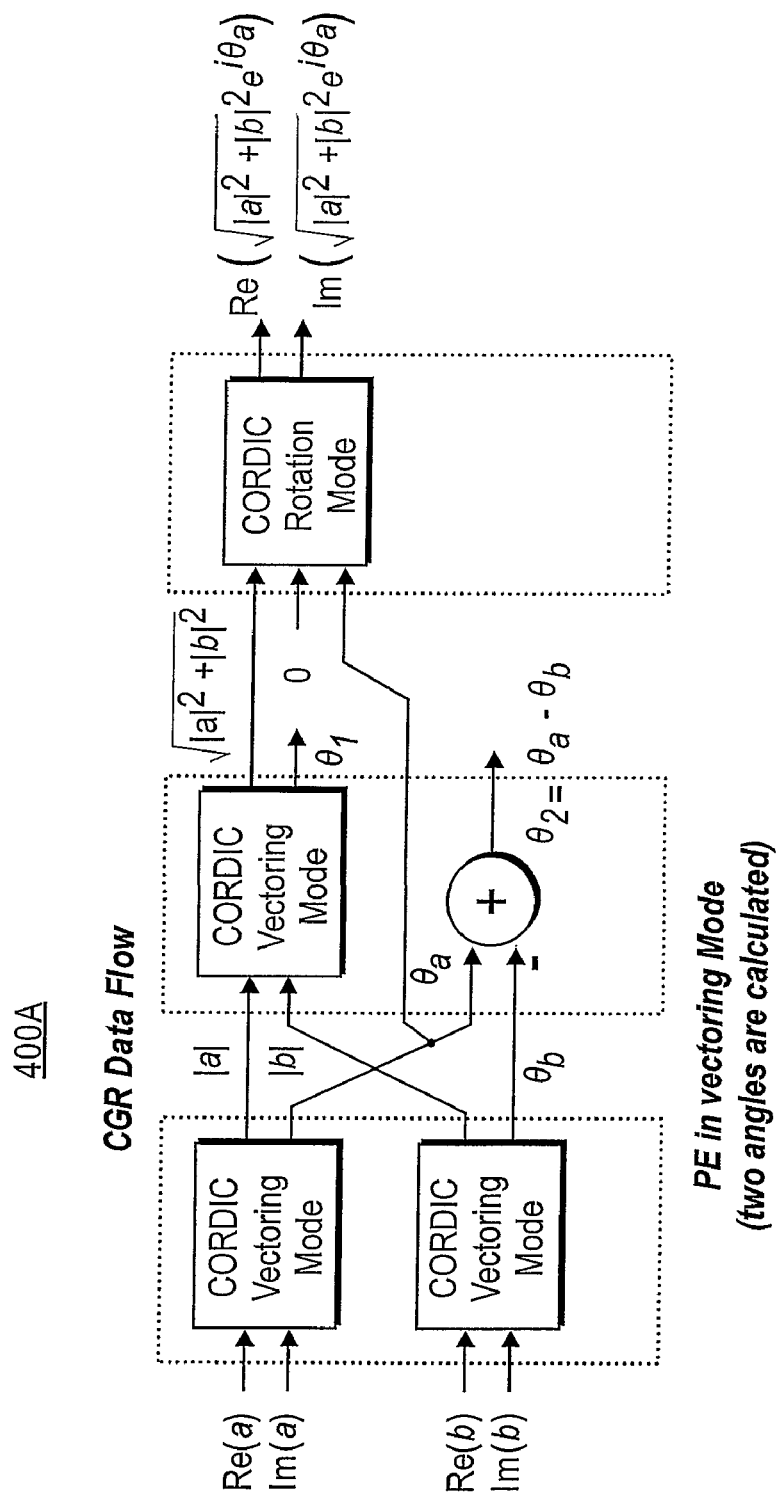
FIGS. 4A-5B illustrate one embodiment of data flows.
Figure 4B:
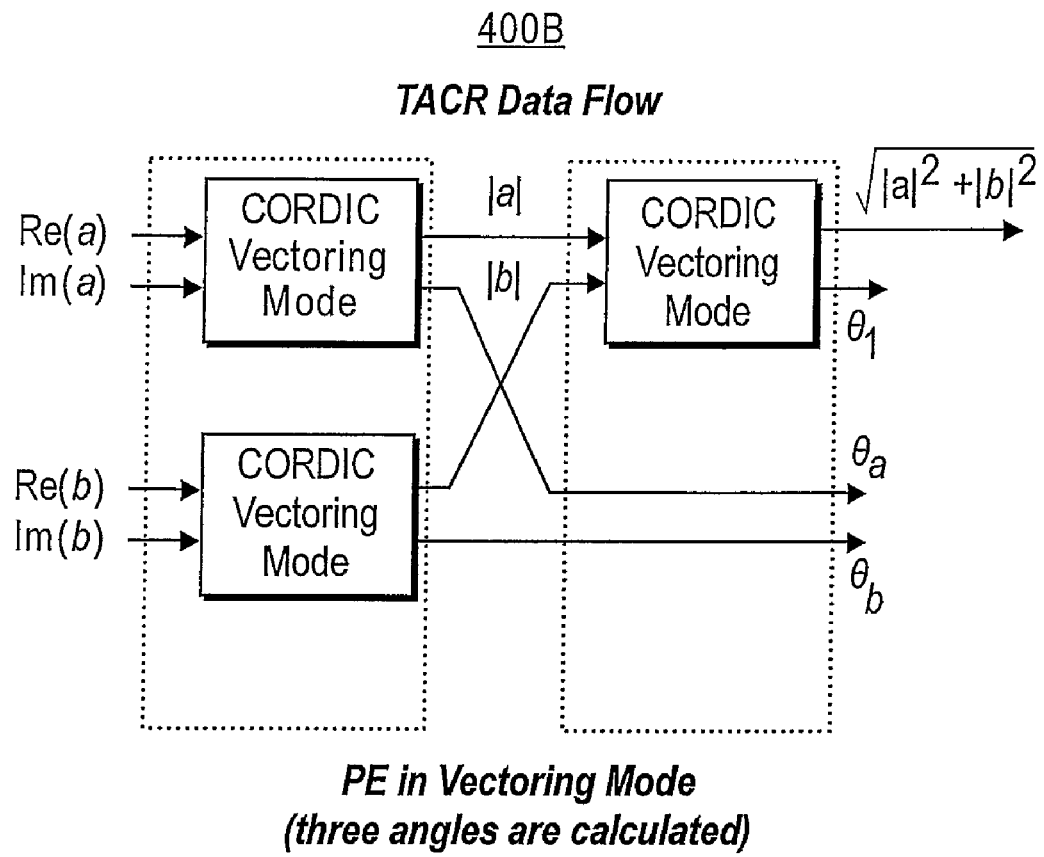
Figure 5A:
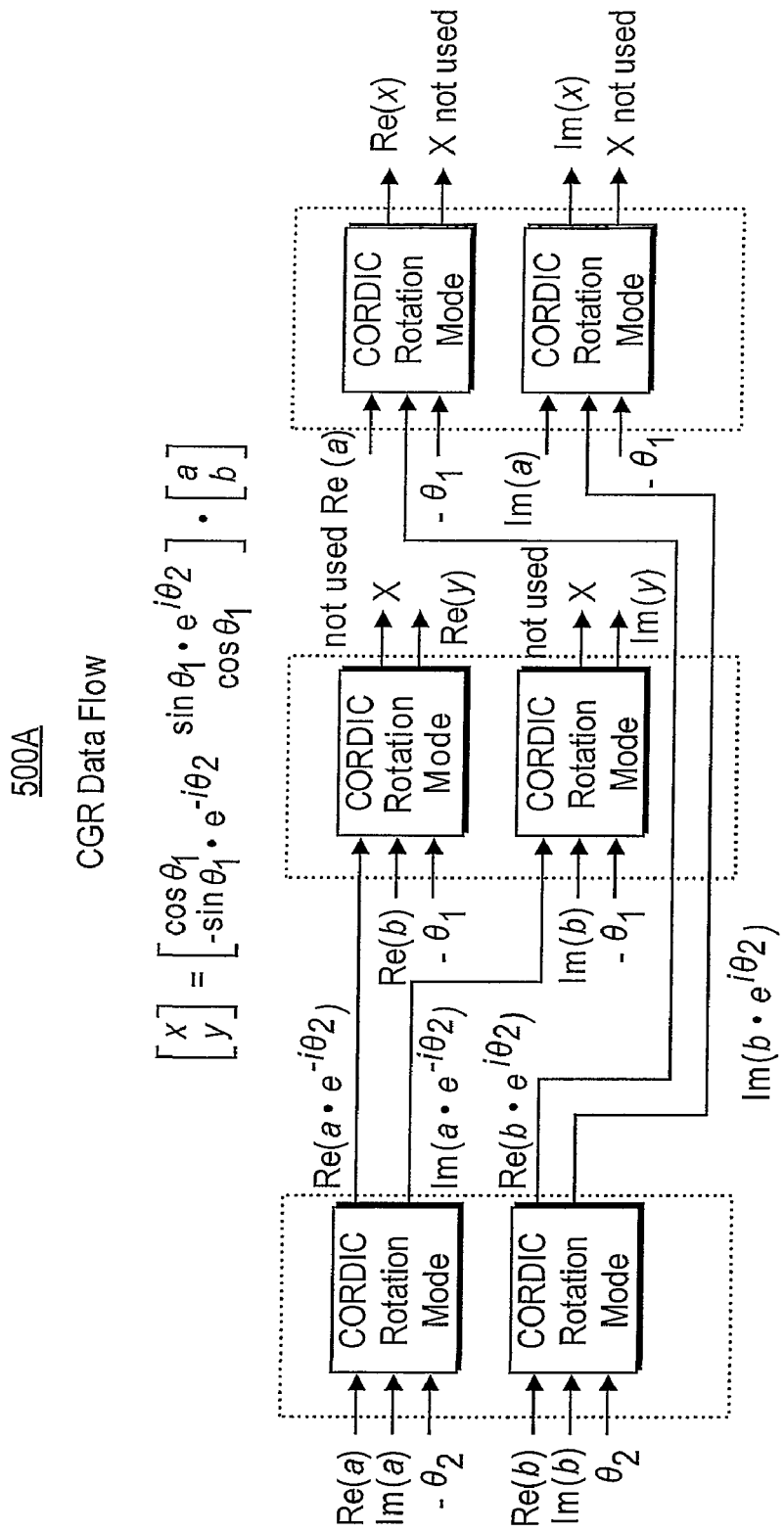
Figure 5B:
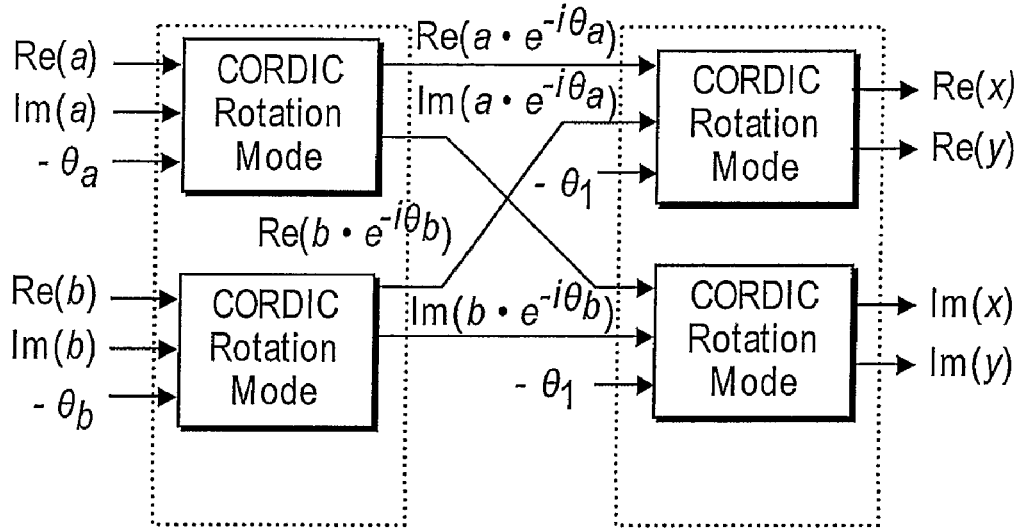

FIGS. 4A-5B illustrate one embodiment of data flows. FIGS. 4A and 4B illustrate a comparison between a CGR data flow 400A and a TACR data flow 400B required by PE modules in vectoring mode. FIGS. 5A and 5B illustrate a comparison between a CGR data flow 500A and a TACR data flow 500B required by PE modules in rotation mode. In this embodiment, the PE modules were realized using two hardwired CORDIC blocks for both vectoring and rotation modes of operation.

As shown in FIGS. 4A and 4B, the vectoring mode for the CGR data flow 400A requires the usage of four CORDIC operations, while the vectoring mode for the TACR data flow 400B requires the usage of three CORDIC operations. As shown in FIGS. 5A and 5B, the rotation mode for the CGR data flow 500A requires the usage of six CORDIC operations, while the rotation mode for the TACR data flow 500B requires the usage of four CORDIC operations. Accordingly, in both vectoring and rotation modes, the internal architecture of the TACR PE modules outperforms CGR in terms of required CORDIC operations and provides full parallel usage of all available hardware CORDIC resources. In contrast to CGR data flows 400A and 500A, there are no idle CORDIC modules on any step of signal processing in TACR data flows 400B and 500B.

Table 1 further summarizes latency estimates for PE modules based on the CGR and TACR approaches, respectively. Table 1 illustrates two possible embodiments for PE modules, namely, one and two hardwired CORDIC modules. As demonstrated by Table 1, the TACR approach may reduce the TSA operation time up to 40 percent.

In Table 1, the PE latency is determined by taking into account two main factors:

N—number of clock cycles required by CORDIC.

$N_{SFC}$—number of clock cycles to make CORDIC Scale Factor Correction (SFC).

It is noted, for latency calculation, that the SFC may be implemented using the same CORDIC hardware resources.

TABLE 1

| | PE Latency for CGR and TACR QRD | | | |
| --- | --- | --- | --- | --- |
| | Latency of PE based on one hardwired CORDIC module | | Latency of PE based on two hard-wired CORDIC modules | |
| QRD approach | Vectoring mode | Rotation mode | Vectoring mode | Rotation mode |
| CGR approach | $4N + 2N_{SFC}$ | $6N + 4N_{SFC}$ | $3N + 2N_{SFC}$ | $3N + 3N_{SFC}$ |
| TACR | $3N + N_{SFC}$ | $4N + 2N_{SFC}$ | $2N + N_{SFC}$ | $2N + N_{SFC}$ |

TABLE 1-continued

PE Latency for CGR and TACR QRD

| QRD approach | Latency of PE based on one hardwired CORDIC module | | Latency of PE based on two hard-wired CORDIC modules | |
|---|---|---|---|---|
| | Vectoring mode | Rotation mode | Vectoring mode | Rotation mode |
| approach Latency Improvement | $N + N_{SFC}$ | $2N + 2N_{SFC}$ | $N + N_{SFC}$ | $N + 2N_{SFC}$ |

Operations for various embodiments may be further described with reference to the following figures and accompanying examples. Some of the figures may include a logic flow. It can be appreciated that an illustrated logic flow merely provides one example of how the described functionality may be implemented. Further, a given logic flow does not necessarily have to be executed in the order presented unless otherwise indicated. In addition, a logic flow may be implemented by a hardware element, a software element executed by a processor, or any combination thereof. The embodiments are not limited in this context.

Figure 6:
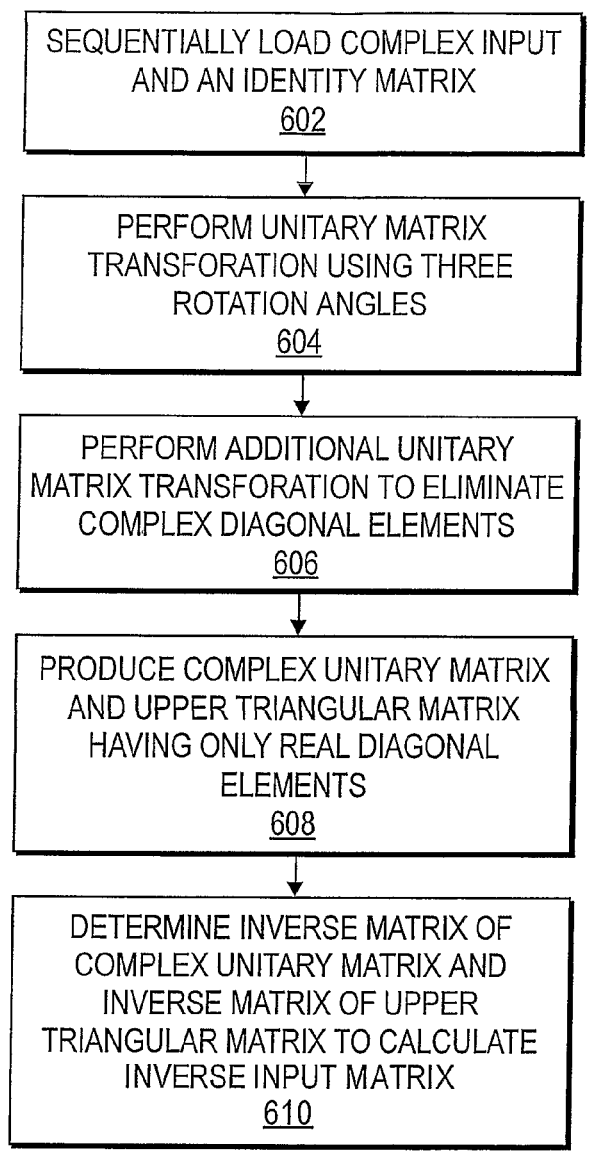
FIG. 6 illustrates one embodiment of a logic flow.

FIG. 6 illustrates one embodiment of a logic flow. FIG. 6 illustrates a logic flow 600 for a TSA/TACR technique to perform signal processing. In various embodiments, the logic flow 600 may be performed by various systems, nodes, and/or modules. It is to be understood that the logic flow 600 may be implemented by various other types of hardware, software, and/or combination thereof. The embodiments are not limited in this context.

The logic flow 600 may comprise sequential loading of an input matrix and an identity matrix at block 602. In various embodiments, the input matrix may comprise a square complex matrix. In one embodiment, for example, the input matrix may comprise a 2×2 square complex matrix $V_{2\times 2}$, that may be defined by the expression:

$$V_{2\times 2} = \begin{bmatrix} Ae^{j\theta_a} & Ce^{j\theta_c} \\ Be^{j\theta_b} & De^{j\theta_d} \end{bmatrix}$$

where $j=\sqrt{-1}$; A, B, C, D—are magnitudes and $\theta_a$, $\theta_b$, $\theta_c$, $\theta_d$—are angles. The embodiments are not limited in this context.

In various implementations, the input matrix and the identity matrix may be loaded into a TSA. The TSA may comprise processing modules including, for example, one or more DU modules, PE modules, and RU modules. The processing modules may comprise CORDIC-based processing modules that may operate in a vectoring mode and a rotation mode. The diagonal elements of the input matrix may comprise control signals for determining the mode of the CORDIC-based processing modules. The embodiments are not limited in this context.

The logic flow 600 may comprise performing a unitary matrix transformation using three rotation angles at block 604. In one embodiment, for example, the unitary matrix transformation for QRD of the input matrix $V_{2\times 2}$ may comprise:

$$\begin{bmatrix} \cos\theta_1 e^{j\theta_2} & \sin\theta_1 e^{j\theta_3} \\ -\sin\theta_1 e^{j\theta_2} & \cos\theta_1 e^{j\theta_3} \end{bmatrix}.$$

In this embodiment, the unitary transformation requires three angles $\theta_1$, $\theta_2$, $\theta_3$ determined by the following equations:

$\theta_1 = \tan^{-1}(B/A);$ $\theta_2 = -\theta_a;$ $\theta_3 = -\theta_b.$

The embodiments are not limited in this context.

In various implementations, the unitary matrix transformation introduces real elements on a matrix diagonal of an upper triangular matrix. In one embodiment, for example, the unitary matrix transformation leads to the appearance of all real elements on the main matrix diagonal except the lowest one.

The logic flow 600 may comprise performing an additional unitary matrix transformation to eliminate complex diagonal elements at block 606. In various embodiments, the additional unitary matrix transformation may eliminate the remaining (lowest) complex diagonal elements on the matrix diagonal of the upper triangular matrix. In one embodiment, for example, the additional unitary matrix transformation for a square 2×2 matrix may comprise:

$$\begin{bmatrix} 1 & 0 \\ 0 & e^{-j\theta_z} \end{bmatrix} \cdot \begin{bmatrix} X & Ye^{i\theta_y} \\ 0 & Ze^{i\theta_z} \end{bmatrix} = \begin{bmatrix} X & Ye^{i\theta_y} \\ 0 & Z \end{bmatrix}.$$

The embodiments are not limited in this context.

The logic flow 600 may comprise producing a complex unitary matrix and an upper triangular matrix having only real diagonal elements at block 608. In one embodiment, for example, the upper triangular matrix may comprise:

$$\begin{bmatrix} 1 & 0 \\ 0 & e^{-j\theta_z} \end{bmatrix} \cdot \begin{bmatrix} \cos\theta_1 e^{j\theta_2} & \sin\theta_1 e^{j\theta_3} \\ -\sin\theta_1 e^{j\theta_2} & \cos\theta_1 e^{j\theta_3} \end{bmatrix} \cdot$$

$$\begin{bmatrix} Ae^{j\theta_a} & Ce^{j\theta_c} \\ Be^{j\theta_b} & De^{j\theta_d} \end{bmatrix} = \begin{bmatrix} 1 & 0 \\ 0 & e^{-j\theta_z} \end{bmatrix} \cdot \begin{bmatrix} X & Ye^{i\theta_y} \\ 0 & Ze^{i\theta_z} \end{bmatrix} = \begin{bmatrix} X & Ye^{i\theta_y} \\ 0 & Z \end{bmatrix}$$

The embodiments are not limited in this context.

The logic flow 600 may comprise determining the inverse matrix of the complex unitary matrix and the inverse matrix of the upper triangular matrix that were produced by QRD of the input matrix. These steps are depicted at block 610 of the logic flow 600. In various embodiments, the upper triangular matrix comprises only real diagonal elements, which significantly simplifies the inversion of the upper triangular matrix (for example applying back substitution algorithm). The inversion of complex unitary matrix is straightforward and may be found as a simple Hermitian transposition. Further, the inverted unitary and upper triangular matrices may be used to calculate inverse input matrix applying matrix multiplication. The embodiments are not limited in this context.

In various implementations, the described embodiments may provide a TSA/TACR architecture and technique for QRD of large size complex matrixes. The developed parallel TSA/TACR architecture may speed up existing very large scale integration (VLSI) approaches for QRD. In various embodiments, the TSA/TACR architecture may improve TSA hardware utilization efficiency by avoiding idle CORDIC modules awaiting data. The TSA/TACR architecture may reduce PE latency and computational complexity leading to a significant time savings for QRD. For example, the TSA/TACR architecture for complex matrix QRD may provide up to a 40% reduction in latency as compared to a conventional CGR architecture.

In various implementations, the described embodiments may provide a CORDIC-based TSA/TACR architecture that produces an upper triangular matrix R having only real diagonal elements that is advantageous for further inversion of matrix R.

In various implementations, the described embodiments may improve the effectiveness of QRD systolic arrays for performing MIMO signal processing and multiple antenna techniques in WiMAX systems. In various embodiments, the TSA/TACR architecture and technique may implement various MIMO algorithms for multiple antenna systems. For example, multiple antenna designs may use up to twelve antennas at a base station, but computational complexity may limit optimization between only four antennas. The TSA/TACR architecture and technique may allow mutual optimization between all twelve antennas leading to a significant performance gain.

In various implementations, the described embodiments may provide a TSA/TACR architecture used as a key QRD signal-processing block in various other high-speed matrix inverse applications to meet the challenge of real-time data processing.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an ASIC, PLD, DSP, and so forth. In yet another example, an embodiment may be implemented by any combination of programmed general-purpose computer components and custom hardware components. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus, comprising:
a node to perform QR decomposition of an input complex matrix using three angle complex rotation, said node comprising:
a three angle complex rotation triangular systolic array to load said input complex matrix and an identity matrix, to perform a unitary matrix transformation using three rotation angles, and to produce a complex unitary matrix and an upper triangular matrix, said upper triangular matrix comprising real diagonal elements.

2. The apparatus of claim 1, wherein said triangular systolic array comprises multiple processing modules including one more delay unit modules, one or more processing element modules, and one or more rotational unit modules.

3. The apparatus of claim 2, wherein said processing modules comprise CORDIC-based processing modules able to operate in a vectoring mode and a rotation mode.

4. The apparatus of claim 3, wherein diagonal elements of said input matrix comprise control signals for determining an operation mode of said processing modules.

5. The apparatus of claim 1, wherein said triangular systolic array is to perform an additional unitary matrix transformation to eliminate complex diagonal elements of said upper triangular matrix.

6. The apparatus of claim 1, wherein said node is to determine an inverse matrix of said complex unitary matrix and an inverse matrix of said upper triangular matrix having real diagonal elements.

7. The apparatus of claim 1, wherein said node is to perform multiple-input multiple output (MIMO) signal processing algorithms.

8. The apparatus of claim 7, wherein said multiple-input multiple output signal processing comprises one or more of a zero-forcing algorithm and a minimum mean square error algorithm.

9. The apparatus of claim 7, wherein said node comprises a multiple-input multiple output transceiver.

10. A system, comprising:
   at least one antenna; and
   a node to couple to said at least one antenna over a multi-carrier communication channel and to perform to perform QR decomposition of an input matrix, said node comprising:
      a triangular systolic array to load said input matrix and an identity matrix, to perform a unitary matrix transformation using three rotation angles, and to produce a complex unitary matrix and an upper triangular matrix, said upper triangular matrix comprising real diagonal elements.

11. The system of claim 10, wherein said triangular systolic array comprises multiple processing modules including one more delay unit modules, one or more processing element modules, and one or more rotational unit modules.

12. The system of claim 11, wherein said processing modules comprise CORDIC-based processing modules able to operate in a vectoring mode and a rotation mode.

13. The system of claim 12, wherein diagonal elements of said input matrix comprise control signals for determining a operation mode of said processing modules.

14. The system of claim 10, wherein said triangular systolic array is to perform an additional unitary matrix transformation to eliminate complex diagonal elements of said upper triangular matrix.

15. The system of claim 10, wherein said node is to determine an inverse matrix of said complex unitary matrix and an inverse matrix of said upper triangular matrix having real diagonal elements.

16. The system of claim 10, wherein said node is to perform multiple-input multiple output (MIMO) signal processing algorithms.

17. The system of claim 16, wherein said multiple-input multiple output signal processing comprises one or more of a zero-forcing algorithm and a minimum mean square error algorithm.

18. The system of claim 16, wherein said node comprises a multiple-input multiple output transceiver.

19. The system of claim 16, wherein said node comprises a processing unit of a multiple-input multiple output receiver to implement complex matrix operations including matrix QR decomposition.

20. A method to perform QR decomposition of an input complex matrix, comprising:
   sequentially loading said input complex matrix to be decomposed and an identity matrix to obtain a complex unitary matrix into a node comprising a triangular systolic array;
   performing a unitary complex matrix transformation using three rotation angles; and
   producing a complex unitary matrix and an upper triangular matrix, said upper triangular matrix comprising only real diagonal elements.

21. The method claim 20, wherein said triangular systolic array comprises multiple processing modules including one more delay unit modules, one or more processing element modules, and one or more rotational unit modules.

22. The method of claim 21, wherein said processing modules comprise CORDIC-based processing modules able to operate in a vectoring mode and a rotation mode.

23. The method of claim 22, further comprising determining an operation mode of said processing modules based on control signals passed through said array jointly with diagonal elements of said input matrix.

24. The method of claim 21, further comprising performing an additional unitary matrix transformation to eliminate complex diagonal elements of said upper triangular matrix using said processing modules of said triangular systolic array.

25. The method of claim 20, further comprising:
   determining an inverse matrix of said complex unitary matrix; and
   determining an inverse matrix of said upper triangular matrix having real diagonal elements.

\* \* \* \* \*